(12) United States Patent
Chu

(10) Patent No.: US 6,511,050 B2
(45) Date of Patent: Jan. 28, 2003

(54) HUMIDIFIER

(75) Inventor: Yong S. Chu, Glendale, CA (US)

(73) Assignee: Dynamo Aviation, Inc., Van Nuys, CA (US)

( * ) Notice: Subject to any disclaimer, the term of this patent is extended or adjusted under 35 U.S.C. 154(b) by 0 days.

(21) Appl. No.: 09/848,380

(22) Filed: May 2, 2001

(65) Prior Publication Data

US 2002/0163090 A1 Nov. 7, 2002

(51) Int. Cl.$^7$ .................................................. B01F 3/04
(52) U.S. Cl. ........................ 261/66; 261/72.1; 261/81; 261/DIG. 48
(58) Field of Search ...................... 261/66, 72.1, 81, 261/79.2, DIG. 48, DIG. 65

(56) References Cited

U.S. PATENT DOCUMENTS

| 4,031,171 | A | | 6/1977 | Asao et al. | |
|---|---|---|---|---|---|
| 4,238,425 | A | | 12/1980 | Matsuoka et al. | |
| 4,257,989 | A | | 3/1981 | Nishikawa | |
| 4,641,053 | A | | 2/1987 | Takeda | |
| 4,724,104 | A | | 2/1988 | Kim | |
| 5,158,716 | A | * | 10/1992 | Hirokane | 261/81 |
| 5,407,604 | A | * | 4/1995 | Luffman | 261/81 |
| 5,693,266 | A | * | 12/1997 | Jung | 261/81 |
| 5,922,247 | A | | 7/1999 | Shoham et al. | |
| 6,053,482 | A | * | 4/2000 | Glenn et al. | 261/66 |
| 6,301,433 | B1 | * | 10/2001 | Montagnino et al. | 261/79.2 |

FOREIGN PATENT DOCUMENTS

| JP | 62-218759 | * | 9/1987 |
|---|---|---|---|
| JP | 3-225133 | * | 10/1991 |
| JP | 3-294733 | * | 12/1991 |

* cited by examiner

Primary Examiner—C. Scott Bushey
(74) Attorney, Agent, or Firm—Gene Scott-Patent Law & Venture Group

(57) ABSTRACT

A humidifier apparatus has a source of water such as a tank, joined through an inlet valve to a manifold providing water flow from the inlet valve to a vent stack and a mist stack. The stacks extend upwardly from the manifold and are positioned for sharing a common water level. Both stacks are open at their top. An ultrasonic mist generator is positioned below the mist stack and is enabled for generating a mist within the mist stack. The vent stack provides a water sensor enabled for detecting a preferred water level in the vent and mist stacks and for controlling the inlet valve to maintain this preferred water level.

5 Claims, 1 Drawing Sheet

HUMIDIFIER

BACKGROUND OF THE INVENTION

1. Field of the Invention

This invention relates generally to humidifiers of the type used in homes and other restricted living or work spaces and more particularly to a humidifier using ultrasonic energy to create a mist.

2. Description of Related Art

The following art defines the present state of this field:

Asao, et al, U.S. Pat. No. 4,031,171 describes an ultrasonic air humidifying apparatus comprising separably connected upper and lower cabinets; a power transformer, high frequency generator and motor-blower contained in the upper cabinet; a water vessel formed in the lower cabinet; a chassis board interposed between the upper cabinet and lower cabinet so as to define an airtight space above the surface of water in the water vessel; a mist conduit pipe fixed to the chassis board, inserted at the lower end into the water in the water vessel and projected at the upper end out of the top part of the upper cabinet; an ultrasonic vibrator assembly fitted to the lower end of the mist conduit pipe; and a water supply tank removably fitted in the upper cabinet so as to supply water into the water vessel, in order to obtain an ultrasonic air humidifying apparatus easy to clean and inspect and high in performance.

Matsuoka et al, U.S. Pat. No. 4,238,425 describes an ultrasonic humidifier comprising an atomizing chamber 2 containing water which is atomized by an ultrasonic vibration board 4 to be discharged therefrom. A water supply tank 11 is provided with a valve rod 14 having a valve 15 adapted to close a water outlet 13 thereof. The valve rod 14 protrudes by the elastic force of a spring. A water supply tank chamber 5 which, when said water supply tank is mounted therein with the valve rod 14 directed downward, relatively depresses the lower end of the valve rod with the bottom thereof to open the water outlet 13. A valve rod receiving chamber 6 communicates with the tank chamber. The water level of the atomizing chamber 2 is equal to the level of said water outlet 13 of the water supply tank which confronts with the valve rod receiving chamber 6. A water delivering path (17a or 17b) establishing communication between the valve rod receiving chamber 6 and the atomizing chamber is bent and elongated in a horizontal plane thereof.

Nishikawa, U.S. Pat. No. 4,257,989 describes a humidifier including a misting mechanism for misting water by a ultrasonic vibrator etc. and a water feeder formed by a water storage tank and a water passage and an ion exchange resin layer disposed in the water passage to the misting mechanism.

Takeda, U.S. Pat. No. 4,641,053 describes an ultrasonic liquid atomizer, an oscillator having a transistor and a resonant circuit a part of which is formed by a piezoelectric vibrator mounted in an energy transfer relationship with liquid in a chamber. The transistor and the resonant circuit receive a full-wave rectified supply voltage to generate ultrasonic energy in the vibrator in the presence of a bias voltage. A soft start circuit has a time constant circuit responsive to the bias voltage and a transistor responsive to an output of the time constant circuit which provides switching action in phase with the full-wave rectified supply voltage so that ultrasonic energy is generated in the form of a series of bursts having durations gradually increasing as a function of time during an initial brief interval from application of the bias voltage to the oscillator. A bias stabilizer has a second time constant circuit responsive to the bias voltage and a transistor connected to the output of the second time constant circuit to establish a low impedance path across the base and emitter of the transistor of soft start circuit after termination of the initial brief interval.

Kim, U.S. Pat. No. 4,724,104 describes a humidifier in which feed water is effectively fed into a purifier. The humidifier according to the invention comprises a ventilation tube through which the air between a valve body and the level of purified water in a humidifying cistern is outwardly ventilated, when the level of the purified water in the humidifying cistern is lowered below the valve body.

Shoham et al, U.S. Pat. No 5,922,247 describes an ultrasonic device for atomizing liquids having at least one atomization unit wherein an upward directed ultrasonic transducer is located at the bottom of the unit with the top of the unit being open. A reservoir is connected to the unit and a minimum liquid level is maintained in each unit during atomization. An electric supply is connected to the transducer and liquid is circulated from the reservoir, across each transducer, and back to the reservoir for removal of impurities.

Glenn et al, U.S. Pat. No. 6,053,482 describes a humidifier for vaporizing water including a base and a wick formed of a water absorbing material positionable on the base. The wick is in fluid communication with a water supply. A device is provided for moving air over the wick disposed adjacent thereto to vaporize the water absorbed by the wick thereby humidifying the air about the humidifier. A filtration device disposed in the flow of the water to the wick is provided and the filtration device is capable of removing impurities from the water supplied to the wick such that the wick is not contaminated by the impurities.

The prior art teaches the use of ultrasonic mist generation in the field of humidifiers but does not teach the combination of elements or the method of the present invention.

SUMMARY OF THE INVENTION

The present invention teaches certain benefits in construction and use which give rise to the objectives described below.

The present invention is a humidifier apparatus having a source of water such as a tank, joined through an inlet valve to a manifold providing water flow from the inlet valve to a vent stack and a mist stack. The stacks and extend upwardly from the manifold and are positioned for sharing a common water level. Both stacks are open at their top. An ultrasonic mist generator is positioned below the mist stack and is enabled for generating a mist within the mist stack. The vent stack provides a water sensor enabled for detecting a preferred water level in the vent and mist stacks and for controlling the inlet valve to maintain this preferred water level.

A primary objective of the present invention is to provide an apparatus and method of use of such apparatus that provides advantages not taught by the prior art.

Another objective is to provide such an invention capable of using either a storage tank or a pressurized source of water and wherein the storage tank may be refilled while continuing operation of the humidifier.

A further objective is to provide such an invention capable of preventing spills although subject to a range of attitude changes and or rough handling.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawing illustrates the present invention. In such drawing is shown a schematic diagram of the present invention showing the relationship between the several elements of the invention and the manner in which said elements are operated to fulfill the objectives of the invention.

DETAILED DESCRIPTION OF THE INVENTION

Figure 1:
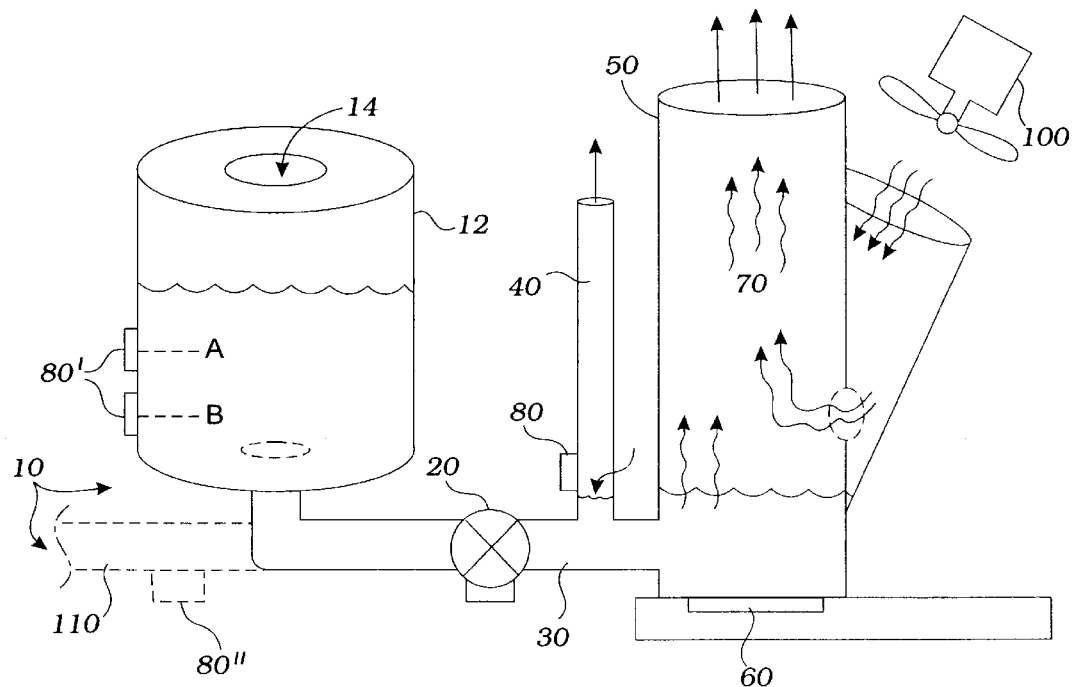

The above described drawing FIGURES illustrate the invention in at least one of its preferred embodiments, which is further defined in detail in the following description.

A humidifier apparatus which comprises a source of water 10 such as a tank 12, joined through an inlet valve 20 to a manifold 30 providing water flow from the inlet valve 20 to a vent stack 40 and a mist stack 50 as is shown in FIG. 1. The stacks 40 and 50 extend upwardly from the manifold 30 and are positioned for sharing a common water level. Both stacks are open at their upper terminal end or top. An ultrasonic mist generating means 60 is positioned below the mist stack 50 and is enabled for generating a mist 70 within the mist stack 50. The vent stack 40 provides a water sensor 80 enabled for detecting a preferred water level 90 in the vent and mist stacks 40, 50, and for controlling the inlet valve 20 to maintain this preferred water level 90.

The invention further preferably provides an air moving means 100 enabled and positioned for driving the mist 70 upward in the mist stack 50.

When the source of water is the storage tank 12, it provides a means for refilling the tank such as a top opening 14. In operation, the tank 12 provides a pair of water sensors 80' arranged and enabled for tripping an alarm and for disabling the ultrasonic mist generating means 60, at two selected water control levels "A" and "B" in the storage tank 12 respectively. A single sensor 80' may alternately be used for both alarming and tripping.

When a pressurized source of water 110 is used instead of the tank 12, water is directed to the inlet valve 20 under pressure. A further water sensor 80" and the vent stack water sensor 80 are enabled together for maintaining the preferred water level 90 in the vent and mist tanks. This is accomplished when the valve 20 is opened only when sensor 80 has a negative output (no water detected) and sensor 80" has a positive output (water detected). When sensor 80 has a positive output once more, then the inlet valve 20 is closed.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A humidifier apparatus which comprises: a source of water joined through an inlet valve to a manifold providing water flow to a vent stack and a mist stack, the stacks extending upwardly from the manifold and positioned for sharing a common water level; an ultrasonic mist generating means positioned below the mist stack for generating a mist therein, the vent stack providing a water sensor enabled for detecting a preferred water level in the vent and mist stacks, and for controlling the inlet valve to maintain said water level.

2. The apparatus of claim 1 further comprising an air moving means enabled and positioned for driving the mist upward in the mist stack.

3. The apparatus of claim 1 wherein the source of water is a storage tank having a means for refilling said storage tank, the water sensor enabled for tripping an alarm and for disabling the ultrasonic mist generating means at, at least one of selected water control levels in the storage tank.

4. The apparatus of claim 3 wherein the water sensor is enabled for tripping an alarm at a first water level and for disabling the mist generating means at a second water level, where the second water level is lower than the first water level.

5. The apparatus of claim 1 further providing a pressurized source of water directed to the inlet valve and further providing a further water sensor, the vent stack water sensor and the further water sensor enabled for maintaining the preferred water level in the vent and mist stacks.

* * * * *